United States Patent Office 3,133,794
Patented May 19, 1964

---

3,133,794
SEPARATION BY LIQUID-LIQUID EXTRACTION
James M. Norwood, Jr., Pensacola, and Edward V. Sherry, Jr., Milton, Fla., assignors, by mesne assignments, to Pittsburgh Plate Glass Company
No Drawing. Filed June 19, 1959, Ser. No. 821,362
2 Claims. (Cl. 23—310)

This invention is particularly directed to liquid-liquid extraction of zirconium and hafnium to provide a product zirconium stream which is essentially free of contained hafnium.

The separation of zirconium and hafnium has been the subject of considerable investigation both in the United States and abroad. One of the accepted methods for the separation of zirconium from hafnium is the selective countercurrent extraction of zirconium into an organic phase while leaving the hafnium in an aqueous phase. The basic principles of this system have been described by Peterson and Beyer, A.I.Ch.E. Journal, March 1956, pages 38 through 41. In general, the extraction system embodies the feed of an acidified aqueous solution of zirconium (with contained hafnium) to an extraction column containing an organic extractant. This organic extractant is fed to one end of the column. Due to a difference in specific gravity of the aqueous and organic phases they can be made to flow countercurrently in a vertical column. Usually the organic phase is lighter and rises countercurrent to the aqueous phase. In this system, zirconium selectively transfers to the organic phase while the hafnium tends to remain in the aqueous phase. It is essential, in the operation of such a system, that the amount of hafnium traveling overhead in the organic extract be kept at an absolute minimum when the product zirconium is to be used in nuclear reactors. Accordingly, standards of quality have been set for the operation of the column so as to reduce the concentration of hafnium in zirconium to less than 100 parts per million in the organic extract leaving the column. The feed to the column will normally have about 20,000 parts of hafnium per million parts of zirconium.

It is a principal object of the present invention to provide a method for operating such an extraction system wherein the monitoring of the column is greatly simplified and the production of pure zirconium is assured despite the presence of contaminated feed to the column or other problems in the operation of the column.

Another object of the invention is to provide such a process which gives a high yield of zirconium.

Still another object of the invention is to provide a process of the above type which also produces a large percentage of the hafnium relatively free of zirconium.

These and other objects of the invention will in part be obvious and will in part appear hereinafter.

For a fuller understanding of the nature and objects of the invention, reference should be had to the following detailed description of a preferred embodiment of the invention.

The present invention will be particularly described in conjunction with a preferred system wherein zirconyl nitrate, containing hafnyl nitrate as an impurity, is fed to an extraction column containing countercurrent aqueous and organic streams. The column may be a rotary disc contactor (RDC) column of a type well known in the extraction art. The organic stream preferably comprises tributyl phosphate diluted with an equal amount of "Mintrol," a mixture of paraffinic, aromatic and naphthenic hydrocarbons having a flash point of about 100° F. It has a specific gravity of 0.755 20/4° C. and gives a specific gravity of about 0.866 to the 50% mixture of "Mintrol" and tributyl phosphate.

The organic stream is preferably equilibrated with nitric acid so that it will have a normality of between 0.8 and 2.2 in nitric acid. The organic stream is fed to the bottom of the column and the aqueous scrub stream is fed to the top of the column so that these two phases travel countercurrent to each other in the extraction column. The aqueous acid solution of zirconyl nitrate is fed to the column intermediate the ends thereof. Accordingly, the portion of the column below the zirconium feed point is the extraction zone and the portion above the zirconium feed point is the scrub zone.

In the present invention, the control of the operation of the column is achieved by removing a sample from the column at a point between the point of feed of zirconyl nitrate to the column and the top of the column where the purified organic solution of zirconyl nitrate leaves the column. This sample is taken at a place where, in the normal operation of the column, the hafnium to zirconium ratio has been substantially decreased, but is not so low that analysis thereof is difficult. In a preferred embodiment, the sample point is such that the aqueous phase contains a $$\frac{Hf \times 10^6}{Zr}$$

ratio which is normally at some fixed value between 10,000 and 1,000.

When the hafnium to zirconium ratio increases above the optimum value at the analytical control point, the volumetric phase ratio between the organic and aqueous phases is shifted to decrease the hafnium to zirconium ratio. This is preferably achieved by decreasing the rate of feed of the organic phase to the bottom of the column, thereby decreasing the ratio of organic phase to aqueous phase throughout the column. The same result as to control of hafnium to zirconium ratio at the control point can be accomplished, although less rapidly, by lowering the point of feed of the zirconium solution to the column. Thus there are two control variables which can be used in the operation of the column to shift the hafnium to zirconium ratio at the control point.

In addition to hafnium to zirconium ratio it is necessary to monitor and control the zirconium concentration at the control point to prevent the increase of the zirconium concentration to the level where operating difficulties or inefficiency will occur. Accordingly, the column is so regulated that the desired upper level of zirconium concentration is not exceeded while the hafnium to zirconium ratio is sufficiently low at the control point that the organic phase leaving the top of the column contains less than 100 parts of hafnium per million parts of zirconium.

While it is highly desirable to assure the transfer of essentially pure zirconium from the top of the column, it is equally desirable to assure that a minimum amount of zirconium leaves the bottom of the column with the aqueous raffinate. Thus the present invention contemplates the regulation of the minimum hafnium-zirconium ratio at the control point, as well as the regulation of the maximum of this ratio at this control point. This is due to the fact that when the $$\frac{Hf \times 10^6}{Zr}$$

ratio at the control point falls too low (e.g., below about 1000) it will be found that the raffinate leaving the bottom of the column contains too much zirconium, resulting in loss of zirconium and increased costs for purification of the hafnium in the raffinate. The simplest method of correcting too low a concentration of hafnium at the control point is to increase the ratio of organic phase to aqueous phase by increasing the feed of organic phase to the bottom of the column.

This method of operating the column provides extremely accurate control of the hafnium concentration in the organic phase leaving the column. It also provides rapid correction for misoperation in the column so as to prevent a carryover of any substantial quantities of hafnium into the zirconium extract leaving the top of the column. Misoperation of the column for even short periods of time can have disastrous effects upon large quantities of purified zirconium organic extract. Accurate and rapid control of the operation of the column is thus essential for economical separation of zirconium from hafnium.

As mentioned briefly above, it is also highly desirable that the column be so operated that substantially all (e.g., 98%) of the zirconium in the feed leaves the column in the organic extract phase. There are several reasons for this. The first is that any zirconium leaving the column in the aqueous raffinate is essentially lost production from the column and must be subsequently recovered or disposed of, either is an economically unattractive alternative. The other reason is that the hafnium has extensive nuclear utility but its usefulness is also a function of its freedom from zirconium. Accordingly, unless the column is operated with high efficiency and with the proper range of hafnium to zirconium ratio and zirconium concentration at the control point, there will be a reduced economic value for the hafnium in the raffinate.

In order to appreciate the operation of an extraction column in accordance with the present invention, several nonlimiting examples are set forth below:

Example 1

The stainless steel column is a rotating-disc contactor 52 feet high by 30 inches in diameter. There are 96 active compartments, each consisting of a flat stainless rotor between two stators. Each compartment is 5½ inches high. Each rotor is 20 inches in diameter by 3/16 inch thick, and is fastened to a central rotating shaft. Each stator is a flat ring 22½ inch I.D. by 29⅜ inch O.D., 3/16 inch thick, held stationary by suitable tie rods. The feed to the column contained .60 pound of zirconium per gallon and 4.2 pounds of $HNO_3$ per gallon. The organic solvent contained 50% tributyl phosphate and 50% "Mintrol" and was equilibrated with nitric acid so as to contain approximately 0.8 pound nitric acid per gallon. It was thus 1.55 N in nitric acid. The aqueous scrub was 5 N nitric acid. Four gallons per minute of feed were introduced in the column at the feed point which was 21 feet above the bottom of the column. Sixteen gallons per minute of organic were introduced at the bottom of the column and 4.0 gallons per minute of the acidified scrub water were introduced at the top of the column.

When the column was operating properly, the analyses of the aqueous phase at the control point showed 0.59 pound of zirconium per gallon and 3000 p.p.m. Hf. The extract contained about 50 parts of hafnium per million parts of zirconium and the raffinate had a hafnium-zirconium ratio of 7 to 1. Upon continued operation of the column the amount of hafnium at the control point started to increase, when it had reached 11,000 p.p.m. the flow of solvent was decreased to 15.0 gal./min. In 5 hours the hafnium concentration of the control point had decreased to 5900 p.p.m. Hf. Due to this action all product produced during this period was less than 50 p.p.m. hafnium.

At another time in the operation of the column, the control point analyzed 0.64 pound of zirconium per gallon and 400 p.p.m. hafnium. The raffinate at this time analyzed 0.01 hafnium-zirconium. The solvent rate was increased from 15.5 to 16.0 with no other changes for 11 hours until it was increased to 17.0 g.p.m. for one hour. Five hours later the control point analyzed 0.60 pound of zirconium per gallon and 2000 p.p.m. hafnium and the raffinate had improved to 1.78 hafnium-zirconium.

In the operation of the column as described above, it is found preferable to maintain the range of volumetric feed ratios (organic to aqueous feed) between 3 to 1 and 4.5 to 1. In a preferred practice of the invention, this range of volumetric phase ratios extends from a minimum of 3.2 to 1 to a maximum of 3.8 to 1.

The techniques utilized in analyzing the solutions taken from the column at the control point are those normally employed in analytical laboratories. Among such tests can be used X-ray absorption, emission spectrographic, chromatographic and gravimetric analyses. The details of such tests do not constitute an essential part of the invention.

While one preferred embodiment of the invention has been given above, numerous modifications thereof may be practiced without departing from the spirit of the invention. For example, other organic extractants such as alkyl phosphates and acetates can be utilized as described in U.S. Patent 2,757,081. Numerous diluents such as many petroleum fractions containing aromatics or straight-chain hydrocarbons can be employed depending upon the particular conditions under which this column is to be operated. In general, it is desired that the diluent give a maximum difference between the specific gravity of the organic and aqueous phases without unduly complicating the operation of the column from safety, degradation or other consideration. It is not necessary that the organic phase be lighter than the aqueous phase but only that they separate readily by gravity. Numerous specific diluents are hydrocarbons, such as hexane, n-heptane, n-octane, the n-alkanes with twelve, thirteen, or fourteen carbon atoms, and methylcyclohexane, carbon tetrachloride have also given good results. A diluent, which also has been successfully used, is a naphtha having a specific gravity of 0.75, a boiling point of 167°–180° F. and a flash point of 120° F. It is sold under the trade name "Varsol." A mixture of any of the diluents enumerated above may also be used.

Since certain changes can be made in the process without departing from the scope of the invention herein involved, it is intended that all matter contained in the above description shall be interpreted as illustrative and not in a limiting sense.

What is claimed is:

1. In the process of separating zirconium from hafnium by countercurrently contacting an organic solvent with an aqueous acid solution, withdrawing organic phase containing zirconium concentrate from one end of the zone of countercurrent contact, withdrawing aqueous solution containing hafnium concentrate from the other end of said zone and feeding an aqueous solution containing zirconium and hafnium into the zone of said contact at a point between the points of withdrawal of said organic phase and said aqueous solution containing hafnium, the improvement which comprises controlling said process by analyzing the aqueous phase in a portion of the zone of countercurrent contact which is between the feed point of the zirconium-hafnium aqueous solution and the point of withdrawal of the organic phase where hafnium removal is incomplete and, when the hafnium to zirconium ratio of said sample falls, increasing the volumetric ratio of organic solvent to zirconium-hafnium aqueous solution feed to the zone and when the hafnium to zirconium ratio of said sample rises, decreasing the volumetric ratio of organic solvent to zirconium-hafnium aqueous solution feed to the zone.

2. The process of claim 1 wherein the hafnium in the zirconium concentrate withdrawn from the zone of contact contains less than 100 parts of hafnium per million parts of zirconium and the aqueous phase is analyzed in a portion of the zone of said countercurrent contact where the hafnium concentration is 1,000 to 10,000 parts per million parts of zirconium.

References Cited in the file of this patent
UNITED STATES PATENTS

| | | |
|---|---|---|
| 2,601,674 | Reman | June 24, 1952 |
| 2,753,250 | Wilhelm et al. | July 3, 1956 |
| 2,757,081 | Hure et al. | July 31, 1956 |

OTHER REFERENCES

Peterson and Beyer: (A.I.Ch.E.) Journal, March 1956, pages 38–41.